US006645282B2

(12) United States Patent
Stone et al.

(10) Patent No.: US 6,645,282 B2
(45) Date of Patent: Nov. 11, 2003

(54) PHASE CHANGE GRAVURE INKS AND METHODS OF PRINTING WITH SAME

(75) Inventors: Edward Stone, Morris Plains, NJ (US); Jitendra J. Modi, Wallington, NJ (US); Robert J. Catena, Belleville, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 174 days.

(21) Appl. No.: 09/754,950

(22) Filed: Jan. 5, 2001

(65) Prior Publication Data

US 2002/0128360 A1 Sep. 12, 2002

(51) Int. Cl.$^7$ .................. C09D 11/12; C09D 11/08; C09D 11/10
(52) U.S. Cl. .................. 106/31.28; 106/31.29; 106/31.3; 106/31.31; 106/31.35; 106/31.4; 106/31.41; 106/31.73; 106/31.61; 106/31.62; 106/31.63; 106/31.67; 106/31.72; 524/306; 524/314
(58) Field of Search .................. 524/306, 314; 106/31.28, 31.29, 31.3, 31.31, 31.35, 31.4, 31.41, 31.61, 31.62, 31.63, 31.67, 31.72, 31.73

(56) References Cited

U.S. PATENT DOCUMENTS

| 655,067 | A | * | 7/1900 | Dun Lany | 106/31.61 |
|---|---|---|---|---|---|
| 2,147,651 | A | | 2/1939 | Jones et al. | 101/70 |
| 2,217,620 | A | | 10/1940 | Jones | 101/157 |
| 2,264,315 | A | | 12/1941 | Jones | 106/26 |
| 2,264,534 | A | | 12/1941 | Jones | 106/31 |
| 2,375,660 | A | | 5/1945 | Jones | 101/170 |
| 3,156,512 | A | | 11/1964 | Peterson et al. | 339/45 |
| 3,578,621 | A | * | 5/1971 | Stapfer | 524/306 |
| 3,653,932 | A | * | 4/1972 | Berry et al. | 106/31.29 |
| 4,421,560 | A | | 12/1983 | Kito et al. | 106/21 |
| 5,385,957 | A | | 1/1995 | Tobias et al. | 523/161 |
| 5,409,530 | A | * | 4/1995 | Kanbayashi et al. | 106/31.29 |
| 5,437,860 | A | * | 8/1995 | Jarvis et al. | 132/202 |
| 5,496,879 | A | | 3/1996 | Griebel et al. | 524/320 |
| 5,574,078 | A | | 11/1996 | Elwakil | 523/161 |
| 5,645,632 | A | | 7/1997 | Pavlin | 106/31.29 |
| 5,777,023 | A | | 7/1998 | Pavlin | 524/590 |

FOREIGN PATENT DOCUMENTS

| WO | WO 91/18065 | 11/1991 | C09D/11/00 |
|---|---|---|---|
| WO | WO 00/78878 A2 | 12/2000 | C09D/11/00 |

* cited by examiner

Primary Examiner—Kelechi Egwim
(74) Attorney, Agent, or Firm—Sidney Persley

(57) ABSTRACT

A hot melt ink composition containing a an alkylene distearate which improves the color strength of the ink and is formed as a reaction product of a $C_4$–$C_8$ diol and at least one acid selected from the group consisting of a $C_{16}$–$C_{18}$ monofunctional acid and a $C_9$–$C_{10}$ difunctional acid.

9 Claims, No Drawings

PHASE CHANGE GRAVURE INKS AND METHODS OF PRINTING WITH SAME

FIELD OF THE INVENTION

The invention relates to hot melt ink compositions to a method of improving the color strength of hot melt ink formulations.

BACKGROUND OF THE INVENTION

Publication gravure uses solvent based inks almost exclusively. These inks, which dry by solvent evaporation, usually contain pigment, resins, volatile solvents like toluene or mineral spirits and additives such as waxes and silicones. Solvents are generally recovered for reuse. Government regulations and environmental concerns regarding the emissions of volatile organic compounds (VOCs) in the air are becoming more stringent. Therefore, it would be desirable to develop a zero VOC publication gravure ink system to satisfy these regulations.

One way to eliminate the solvents and other volatile organic compounds is to require that the ink solidify immediately on transfer from the cylinder to the paper. Some early patents (U.S. Pat, Nos. 2,147,651, 2,217,620, 2,264,315, 2,264,534 and 2,375,660) describe the use of a combination of amorphous resins and crystalline waxes or diluents for this purpose. Polyamides (U.S. Pat. No. 3,156,512) were used in combination with non-volatile glycol ethers and hydrocarbon oils as diluents. More recently, Siegwerk Druckfarben GmbH & Co. described a hot melt ink system based on acrylic resins (German Patent DE 42 05 636 A1; German Patent DE 42 05 713 A1 and U.S. Pat. No. 5,496,879) in a solid fatty acid diluent.

PCT patent application GB91/00812 describes hot melt ink formulations containing glycol monoesters with improves transparency and quality of color projection.

However, the hot melt ink formulations of the prior art still have relatively poor quality color strength and low optical print density.

SUMMARY OF THE INVENTION

The present invention relates to a hot melt ink formulation containing an alkylene diester, formed as a reaction product of a $C_4$–$C_9$ diol and at least one acid selected from the group consisting of a $C_{16}$–$C_{18}$ monofunctional acid and a $C_9$–$C_{10}$ difunctional acid.

The present invention also relates to a method of improving the color strength of a hot melt ink formulation by mixing an alkylene distearate into the formulation prior to applying the ink to a substrate, wherein said alkylene distearate is formed as a reaction product of a $C_4$–$C_8$ diol and at least one acid selected from the group consisting of a $C_{16}$–$C_{18}$ monofunctional acid and a $C_9$–$C_{10}$ difunctional acid.

The present invention also relates to a method of improving the optical print density of a hot melt ink formulation by mixing an alkylene distearate into the formulation prior to applying the ink to a substrate, wherein said alkylene distearate is formed as a reaction product of a $C_4$–$C_8$ diol and at least one acid selected from the group consisting of a $C_{16}$–$C_{18}$ monofunctional acid and a $C_9$–$C_{10}$ difunctional acid.

DETAILED DESCRIPTION OF THE INVENTION

It has been surprisingly found that the objectives of the present invention could be realized by using an alkylene diester in a hot melt ink composition, wherein said alkylene diester is formed as a reaction product of a $C_4$–$C_9$ diol and at least one acid selected from the group consisting of a $C_{16}$–$C_{18}$ monofunctional acid and a $C_9$–$C_{10}$ difunctional acid.

Preferably, the monofunctional acid is cetyl acid, stearic acid or tall oil fatty acid and the difunctional acid is azelaic acid or sebacic acid.

Also preferably, the alkylene diester is a mixed diester of a carboxylic acid, a fatty acid and 1,6-hexandiol. More preferably, the alkylene diester is an alkylene distearate and the alkylene distearate is hexylene distearate.

It is also preferable that the hot melt ink composition of the present invention be a conventional hot melt formulation and include a resin, wax, dispersant, and color pigment.

The hot melt ink compositions of the present invention are suitable for use in ink jet, flexographic, intaglio, and gravure printing.

Preferably, the hot melt jet ink formulation of the present invention will include at least one rheology modifier comprising at least one plasticizer, to contribute to increased flexibility, cohesion, and durability of the ink composition. According to the invention, the most preferred jet ink plasticizer is an ester of benzoic acid present in an amount of no more than 25 wt. % preferably no more than 18 wt. %, most preferably 5 to 15 wt. % based on the weight of the ink composition.

The hot melt ink composition may additionally include rheology modifiers present in an amount of no more than 40 wt. %, preferably no more than 30 wt. %, most preferably no more than 20 wt. %, of the ink composition. These materials may also serve to improve scratch and rub resistance, make the ink more durable, and viscosity and tackiness.

Suitable rheology modifiers include stearic acid, lauric acid, linear polyethylene, phthalates, citrates, and oxidized polyethylenes, behenic acid, stearone, aluminum stearate, carnauba wax, microcrystalline waxes, paraffin wax, polyethylene wax, candelilla wax, montan wax, and the like.

Because hot melt jet ink compositions prepared in accordance with the invention are heated during jetting, antioxidants, to inhibit thermally induced oxidation, may be added to the composition. Suitable antioxidants include those conventionally used such as dibutyl hydroxy toluene compounds and the like. The antioxidant should be present in the amount of 0.1 to 5 wt. %, based on the weight preferably 0.5 to 3.0 wt. %, of the ink composition.

Suitable coloring agents, present in amount of at least 0.1 to 9 wt. %, preferably 0.5 to 3 wt. % based on the weight of the ink composition, include pigments and dyes. Any dye or pigment may be chosen provided that it is capable of being dispersed in the hot melt ink composition, is compatible with the other ink components, and is stable at a temperature of 100° C. to 140° C. As for use as a pigment, the pigment particles should have a diameter of less than 1 micron.

The hot melt jet ink compositions of the present invention are generally prepared in two steps. In the first step, the colorant dispersion is prepared by combining together all the dispersion ingredients except for the coloring agent, heating the mixture to its melting point, and slowly stirring the mixture until homogeneous. Next the coloring agent is added slowly and mixed to homogeneity. The dispersion is then collected and solidified at room temperature.

The second step consists of combining the ink composition ingredients except for the dispersion containing the coloring agent, heating the mixture to its melting point, which generally does not exceed 135° C., and slowly stirring the mixture until homogeneous. The dispersion is slowly added to the mixture which is maintained in the molten state and the resultant molten mixture stirred until uniform. The molten mixture may then be filtered to remove particles larger than 1 micron in size when the coloring agent is a pigment.

The properties of the present hot melt inks should be similar to those of conventional inks. As with conventional gravure inks, print viscosity should be about 10 cps or less. As a hot melt ink, this viscosity must be attained at about 200° F. to 275° F. without producing any VOCs (or smoke) at this temperature.

EXAMPLE 1

Preparation of Blue Pigment Dispersion #1

Escorez resin 5380 (hydrogenated petroleum hydrocarbon resin) was melted and mixed in the presence of dicyclohexylphthalate (DCHP), Solsperse 17000 (quaternary amine derivative of a fatty acid condensation product) and Solsperse 5000 (quaternary salt of a copper phthalocyanine derivative) for 30 minutes in a heated (100° C.) mixer at 80 to 90 rpm speed. A blue pigment was added at a slow speed for 50 rpm and mixed until it became homogeneous. Next, the mixing speed was increased to 100 rpm and the blue pigment was ground for 2½ hours. The dispersion was then collected and allowed to solidify at room temperature. The amounts of ingredients used in the preparation of the blue pigment dispersion are outlined in Table 1.

TABLE 1

| Blue Pigment Dispersion #1 | Wt. % |
|---|---|
| Escorez 5380 (M.P. 85° C.) | 42.00 |
| R9505 (polyesteramide hyper dispersant) | — |
| Solsperse 17000 (quaternary amine derivative of a fatty acid condensation product) | 6.00 |
| Solsperse 5000 (quaternary salt of a copper phthalocyanine derivative) | 2.00 |
| 52-163 blue (phthalocyanine pigment blue 15:4) | 50.00 |
| Total | 100 |

EXAMPLE 2

Effect of Various Esters on the Optical Print Density and Color Strength Development of the Hot Melt Inks Escorez 5600 resin (petroleum hydrocarbon resin) was melted and mixed with waxes in the presence or absence of a monoester or various types of diesters at 110° C. to 115° C. until it became homogeneous. Chips of blue dispersion #1, prepared according to Example 1, were added slowly to the melted Escorez 5600 resin and waxes and mixed at a slow speed mixer for 10 to 15 minutes until it became homogeneous. The amounts and types of ingredients used to prepare various hot melt inks are outlined in Table 2.

TABLE 2

The effect of the addition of monoester or various diesters on the optical print density and color strength development of hot ink formulations.

| Hot melt inks formulations (HMI) | #1 (std) | #2 | #3 | #4 | #5 | #6 | #7 | #8 | #9 | #10 | #11 | #12 |
|---|---|---|---|---|---|---|---|---|---|---|---|---|
| Blue Dispersion #1 | 10.00 | 10.00 | 10.00 | 10.00 | 10.00 | 10.00 | 10.00 | 10.00 | 10.00 | 10.00 | 10.00 | 10.00 |
| Escorez 5600 (m.p. 102° C.) | 20.00 | 20.00 | 20.00 | 20.00 | 20.00 | 20.00 | 20.00 | 20.00 | 20.00 | 20.00 | 20.00 | 20.00 |
| Rosswax 3002 (m.p. 106° C.) | 30.00 | 20.00 | 20.00 | 20.00 | 20.00 | 20.00 | 20.00 | 20.00 | 20.00 | 20.00 | 20.00 | — |
| Polywax 655 (m.p. 94° C.) | 40.00 | 25.00 | — | — | — | — | — | — | — | — | — | — |
| Microwax 190 (m.p. 88° C.) | — | — | 25.00 | 25.00 | 25.00 | 25.00 | 25.00 | 25.00 | 25.00 | 25.00 | 25.00 | 25.00 |
| Hexylene distearate or (Stearic acid/1,6-Hexanediol) ester | B | 25.00 | 25.00 | — | — | — | — | — | — | — | — | — |
| Azelaic acid/1,6-Hexanediol/Stearic acid) ester | — | — | — | 25.00 | — | — | — | — | — | — | — | — |
| (Azelaic acid/Sebacic Acid/1,6-Hexanediol/Stearic acid) ester* | — | — | — | — | 25.00 | — | — | — | — | — | — | — |
| (Stearic acid/TOFA/1,6-Hexanediol) ester | — | — | — | — | — | 25.00 | — | — | — | — | — | — |
| (Stearic acid/1,6-Hexanediol, 1,4 Butanediol) ester | — | — | — | — | — | — | 25.00 | — | — | — | — | — |
| (Aezlaic acid/Sebacic acid/1,6-Hexanediol/Stearic acid) ester** | — | — | — | — | — | — | — | 25.00 | — | — | — | — |
| (1,6-Hexanediol/Benzoic acid) ester | — | — | — | — | — | — | — | — | 25.00 | — | — | — |
| (1,4-Butanediol/Benzoic acid) ester | — | — | — | — | — | — | — | — | — | 25.00 | — | — |
| (Stearic acid/Benzoic acid/1,6-Hexanediol) | — | — | — | — | — | — | — | — | — | — | 25.00 | — |
| sorbitan monostearate (monoester with hydroxyl value approximately 149–157) | — | — | — | — | — | — | — | — | — | — | — | 25.00 |

TABLE 2-continued

The effect of the addition of monoester or various diesters on the optical print density and color strength development of hot ink formulations.

| Hot melt inks formulations (HMI) | #1 (std) | #2 | #3 | #4 | #5 | #6 | #7 | #8 | #9 | #10 | #11 | #12 |
|---|---|---|---|---|---|---|---|---|---|---|---|---|
| | 100.00 | 100.00 | 100.00 | 100.00 | 100.00 | 100.00 | 100.00 | 100.00 | 100.00 | 100.00 | 100.00 | 100.00 |
| Optical Print Density | 0.66 | 1.28 | 1.33 | 1.30 | 1.27 | 1.30 | 1.30 | 0.84 | 0.95 | 0.75 | 1.31 | 1.05 |
| Color strength development | 100 | 800 | 772 | 747 | 681 | 719 | 911 | 211 | 292 | 139 | 827 | 339 |

*(0.50 Mol) Azelaic acid/(0.50 Mol) Sebacic acid/(2.0 Mol) 1,6-Hexanediol/(2.0 Mol) Stearic acid.
**(1.0 Mol) Azelaic acid/(1.0 Mol) Sebacic acid (3.0 Mol) 1,6-Hexanediol/(2.0 Mol) Stearic acid.

To test for optical print density and color strength development, draw downs of the finished hot melt inks were prepared using a 3"×5" size uncoated paper. The hot melt inks were preheated to 110° C. The 3"×5" size uncoated paper are placed on a 110° C. heated hot plate for 3 to 5 minutes to heat the paper. Few drops of the melted ink put on the heated paper and a 110° C. preheated Meyer bar rod is used with normal force to make draw downs.

Optical print densities of the draw downs were read using a densitometer as describes in the prior art. Briefly, the optical print density is taken with a Techkon 410E densitometer. Three measurements are taken with the instrument and the reported value is the average of these measurements. The color strength developments of the draw downs were measured using a Datacolor International Spectraflash SF 600 Plus (both specular and UV measurements). Hot melt ink formulation #1 containing no ester was used as the standard with a color strength reading of 100.

The results at the bottom of Table 2 show that the addition of (Stearic acid/1,6-Hexanediol) ester, (Azelaic acid/1,6-Hexanediol/Stearic acid) ester, (Azelaic acid/Sebacic Acid/1,6-Hexanediol/Stearic acid) ester, (Stearic acid/TOFA/1,6-Hexanediol) ester, (Stearic acid/1,6-Hexanediol, 1,4 Butanediol) ester or (Stearic acid/Benzoic acid/1,6-Hexanediol) significantly improved the color strength and optical print density of hot melt ink formulation compared with a standard hot melt ink formulation without any esters or with hot melt ink formulations containing only a monoester (sorbitan monostearate),(Aezlaic acid/Sebacic acid/1,6-Hexanediol/Stearic acid) ester,(1,6-Hexanediol/Benzoic acid) ester, or (1,4-Butanediol/Benzoic acid) ester Benzoic acid).

The invention has been described in terms of preferred embodiments thereof, but is more broadly applicable as will be understood by those skilled in the art. The scope of the invention is only limited by the following claims.

What is claimed is:

1. An improved hot melt ink composition comprising:

a resin;

a wax;

a dispersant;

a color pigment; and whereby the improvement comprises a hot melt ink composition having an alkylene diester, wherein said alkylene diester is formed as a reaction product of a $C_4$–$C_9$ diol and at least one acid selected from the group consisting of a $C_{16}$–$C_{18}$ monofunctional acid and a $C_9$–$C_{10}$ difunctional acid.

2. The composition of claim 1 wherein the monofunctional acid is cetyl acid.

3. The composition of claim 1 wherein the monofunctional acid is stearic acid.

4. The composition of claim 1 wherein the monofunctional acid is tall oil fatty acid.

5. The composition of claim 1 wherein the difunctional acid is azelaic acid.

6. The composition of claim 1 wherein the difunctional acid is sebacic acid.

7. The composition of claim 1 wherein the alkylene diester is a mixed diester of a nonfatty carboxylic acid, a fatty acid and 1,6-hexandiol.

8. The composition of claim 1 wherein the alkylene diester is an alkylene distearate.

9. The composition of claim 8 wherein the alkylene distearate is hexylene distearate.

* * * * *